United States Patent
Uphoff

(10) Patent No.: US 6,837,998 B2
(45) Date of Patent: Jan. 4, 2005

(54) METHOD AND CONDITIONING AGENT FOR TREATING WASTE WATER AND AIR POLLUTANTS

(75) Inventor: Christian Uphoff, Aschau (DE)

(73) Assignee: Georg Fritzmeier GmbH & Co., Grosshelfendorf (DE)

(*) Notice: Subject to any disclaimer, the term of this patent is extended or adjusted under 35 U.S.C. 154(b) by 0 days.

(21) Appl. No.: 10/465,965

(22) PCT Filed: Dec. 19, 2001

(86) PCT No.: PCT/DE01/04784
§ 371 (c)(1),
(2), (4) Date: Jun. 27, 2003

(87) PCT Pub. No.: WO02/051756
PCT Pub. Date: Jul. 4, 2002

(65) Prior Publication Data
US 2004/0058430 A1 Mar. 25, 2004

(30) Foreign Application Priority Data

Dec. 27, 2000 (DE) .......................... 100 65 435
Apr. 17, 2001 (DE) .................... 200 22 664 U
Oct. 8, 2001 (DE) .......................... 101 49 447

(51) Int. Cl.[7] .............................. C02F 3/34; C02F 1/52
(52) U.S. Cl. ...................... 210/601; 210/611; 210/615; 210/631
(58) Field of Search ................................ 210/601, 610, 210/611, 620, 615–617, 631; 435/177, 180

(56) References Cited

U.S. PATENT DOCUMENTS

| | | | |
|---|---|---|---|
| 4,337,313 A | 6/1982 | Hershberger et al. | 435/177 |
| 4,454,259 A * | 6/1984 | Reischl et al. | 523/129 |
| 4,608,397 A * | 8/1986 | Reischl | 521/101 |
| 4,879,239 A | 11/1989 | Daggett et al. | 435/252.1 |

FOREIGN PATENT DOCUMENTS

| | | |
|---|---|---|
| DE | 42 12 334 C1 | 6/1993 |
| EP | 0 503 438 A2 | 9/1992 |
| EP | 0 472 249 A2 | 2/1999 |
| GB | 2 153 83 4 A | 8/1985 |
| WO | WO 93/25480 | 12/1993 |

* cited by examiner

*Primary Examiner*—Fred G. Prince
(74) *Attorney, Agent, or Firm*—Boyle Fredrickson Newholm Stein & Gratz S.C.

(57) ABSTRACT

What is disclosed is a conditioning agent for the treatment of effluent and a process for preparing such a conditioning agent which includes a proportion of flocculating or precipitating agent containing polymers as well as a proportion of micro-organisms.

32 Claims, 2 Drawing Sheets

METHOD AND CONDITIONING AGENT FOR TREATING WASTE WATER AND AIR POLLUTANTS

BACKGROUND OF THE INVENTION

1. Field of the Invention

The invention relates to a process and a conditioning agent for the treatment of effluent and atmospheric pollutants.

2. Description of Related Art

In the biological treatment of effluent or waste water, micro-organisms convert the organically usable ingredients of the effluent to be purified into cell material or into gases such as, e.g., $CO_2$, methane, hydrogen sulfide and others. Depending on the process management, one differentiates between aerobic or anaerobic processes, wherein in communal effluent purification plants as a rule the aerobic processes are used which are better manageable. In such effluent purification plants a mechanical purification is followed by biological decomposition in an activated sludge tank wherein the carrier of biological purification, i.e., the sludge activated by micro-organisms, is received. Air is introduced into this activated sludge tank to thus supply the oxygen required for biological conversion. In this aeration of the effluent in the activated sludge or aeration tank there form slimy, macroscopically discernible flakes which settle as sedimented sludge when aeration is completed.

In accordance with the publication www.unipotsdamm.de/u/putz/oktober 1996/30.htm, organic or inorganic polymers which support the growth of flakes are added to the effluent in order to raise the efficiency of the biological conversion. The polymers are designed for the formation of flakes that are as compact and dense as possible and a surface with a low degree of unevenness, which later agglomerate into larger conglomerates of flakes and thus are impervious to the effect of shear forces owing to the flow of effluent.

The like flocculation aids are polymers having a different charge density, charge distribution, and molecular size depending on the purpose to be achieved. They are used for the separation of solids from suspensions with organic or inorganic particles, which may be distributed to a degree of colloidal consistency. Owing to the high adsorption potential, flocculation aide act as a link between the solid particles and microflakes created by the use of flocculating agents, which build up into larger-size flakes (flocculation).

Besides the polymers acting as flocculation aids, the conditioning agent may moreover contain precipitation and flocculating agents. In effluent purification, Al or Fe salts are frequently used as flocculating agents, which form precipitations having a very large surface in particular ranges of pH. On these flakes heavy metals or other undesirable effluent components may be adsorbed. In effluent purification, monomer salts e.g. of aluminum, calcium, iron and magnesium, or polymer aluminum or iron compounds, respectively, are used as precipitating agents.

Despite considerable progress in polymer chemistry, the present conditioning agent may only be designed for an average composition of the effluent to be treated, wherein biological conversion may not suffice requirements particularly in the event of biosphere fluctuations, i.e., fluctuations of the proportion of organic matter in the effluent to be treated.

SUMMARY OF THE PRESENT INVENTION

In contrast, the invention is based on the objective of furnishing a conditioning agent and a process for the treatment of effluent and atmospheric pollutants, to provide effluent treatment which is largely independent of fluctuations of the biosphere present in the effluent.

This objective is attained by a conditioning agent in accordance with claim 1, a process having the features of claim 10, and use of the conditioning agent in accordance with claim 15.

In accordance with the invention, the conditioning agent contains a predetermined proportion of micro-organisms, so that biological activity is substantially determined by the microbiotic mixed cultures contained in the conditioning agent, and thus is largely independent of the composition of the micro-organisms contained in the effluent or in the air. As will be described in more detail in the following, a stable bio-film forms on the surface of the polymers upon introduction of the conditioning agent containing the polymers and micro-organisms, which bio-film is not destroyed even by high turbulence of the effluent. Thus an immobilization of the micro-organisms relative to the flake is achieved, resulting in largely ideal conditions for biological conversion.

It was surprisingly found that the conditioning agent may also be used for purifying air charged with pollutants.

In a particularly preferred embodiment the conditioning agent includes a microbiotic mixed culture containing a proportion of photosynthetically active micro-organisms and a proportion of luminous bacteria in a biological solution.

As was mentioned at the outset, biopolymers and other organic or inorganic polymers are used as flocculation aids. Most recently interest is focusing on so-called conjugated polymers which emit light when binding a particular substance. Conjugated polymers consist of semiconductor materials and have hitherto predominantly been used for physico-technical purposes, e.g. for solar cells or flat screens. The luminescence of these semiconducting polymers may be used to completely or partially replace the luminous bacteria of the microbiotic mixed culture.

Handling and storage of the conditioning agent is particularly simple if the micro-organisms are deep-frozen or freeze-dried for storage, wherein the process conditions upon cooling down have to be selected in such a way as to prevent damage to the micro-organisms.

With regard to the composition of the microbiotic mixed culture, for the sake of simplicity reference is made to the same applicant's earlier patent application DE 100 62 812, the contents of which are herewith fully and fully incorporated by reference with the disclosure of the instant patent application.

Further advantageous developments of the invention are subject matters of the further subclaims.

BRIEF DESCRIPTION OF THE DRAWINGS

Preferred embodiments of the invention shall in the following be explained in more detail by referring to schematic drawings, wherein.

DETAILED DESCRIPTION OF THE PREFERRED EMBODIMENTS

Figure 1:
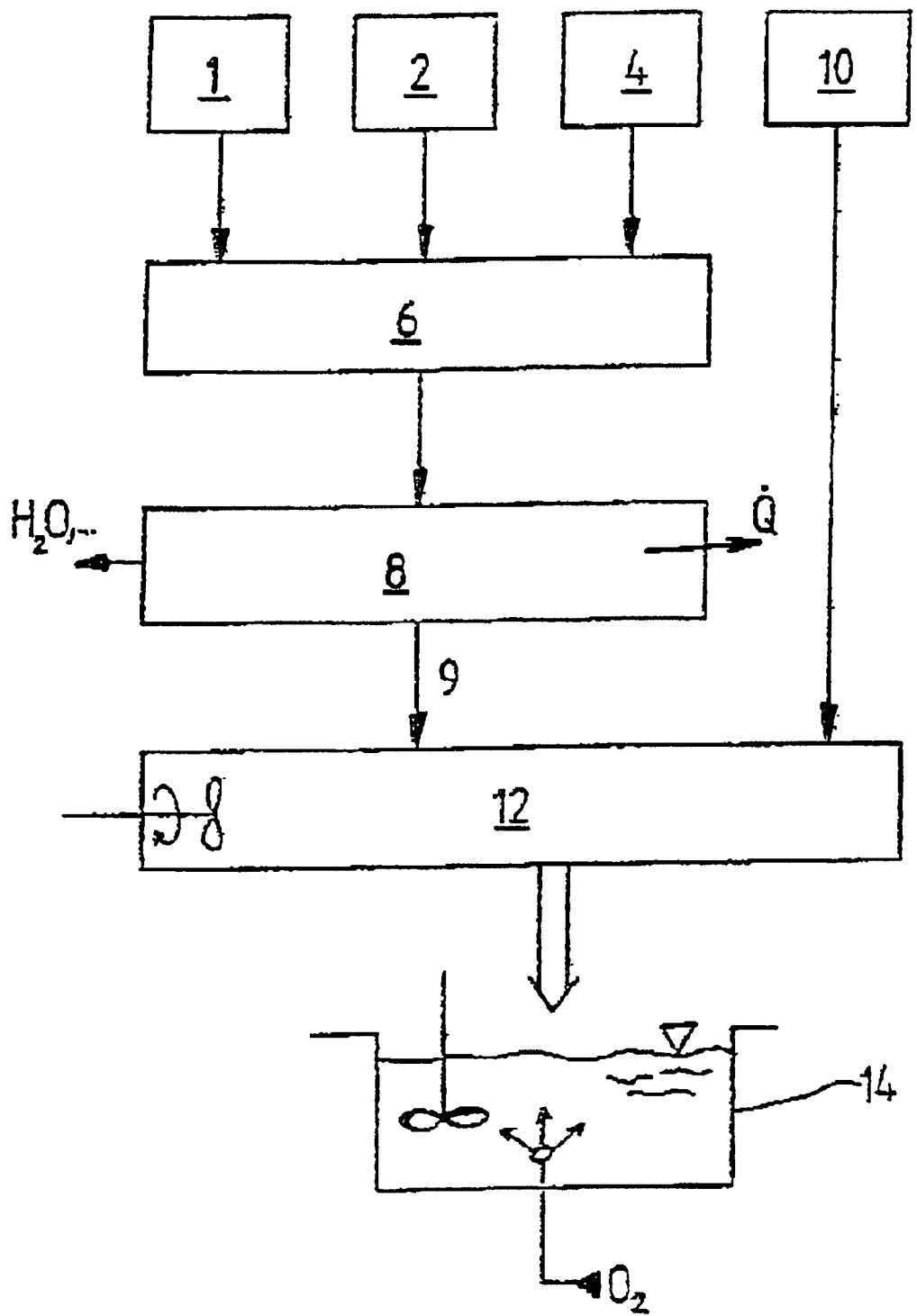
FIG. 1 is a block diagram of a process of the biological treatment of effluent.

In the following, a process for the biological treatment of effluent (communal, industrial effluent) is described by referring to FIG. 1, wherein a conditioning agent containing a proportion of flocculating and/or precipitating agents as well as precipitation aids, e.g. organic or inorganic and also conjugated polymers, is admixed to the effluent in order to enhance flake growth. Such flocculating and precipitating agents are substances bringing about an agglomeration of the suspended matter in the effluent and enabling more rapid separation of the solid phase from the liquid phase as a result of the obtained size increase of the particles. In addition to the polymers this conditioning agent may contain further constituents like, e.g., metals and other constituents that enhance flake formation. In accordance with the invention the conditioning agent contains microbiotic mixed cultures in a defined composition, whereby substantially the metabolic reactions in the flake are determined.

In accordance with the enclosed process diagram, a preferred embodiment of the microbiotic mixed culture (microbiological composition) contains a proportion of photosynthetically active micro-organisms 1, a proportion of luminous bacteria or light-emitting micro-organisms having similar activity 2, which are solubilized in a broad-band biological solution 4. As was mentioned at the outset, a part of the light-emitting micro-organisms may be replaced with conjugated polymers which emit light when particular biomolecules are present in the microbiological composition.

The interaction between the photosynthetically active micro-organisms and the luminous bacteria or the conjugated polymers has the result of the photosynthetically active micro-organisms being stimulated to photosynthesis by the emitted light. The micro-organisms engage in photosynthesis with hydrogen sulfide and water as an educt and release sulfur or oxygen, respectively. Moreover they may bind nitrogen as well as phosphate and decompose organic as well as inorganic matter.

Preferably in the inventive microbiological composition photosynthetically active micro-organisms are used, which facultatively are phototropic. Phototropic facultatively means that the micro-organisms can grow both under anaerobic conditions in light and under aerobic conditions in the dark.

Among the photosynthesis bacteria there are gram-negative aerobic rod-shaped and circular bacteria and gram-positive circular bacteria. These may include endospores or be present without spores. Among them there are for instance also gram-positive actinomycetes and related bacteria.

In this context it is also possible to name nitrogen-fixing organisms. Among these there are, e.g., algae, such as Anabena Nostoc in symbiosis with Azola. Moreover it is possible to name actinomycetes, e.g. Frankia in symbiosis with alder and bacteria, such as Rhizobium in symbiosis with leguminosae.

Moreover it is also possible to use aerobic algae, azotobacter, methane-oxidizing bacteria and sulfur bacteria. Among these there are also green sulfur bacteria and brown-green photosynthesis bacteria. Here one may also name non-purple sulfur bacteria and purple sulfur bacteria.

It is preferred if, in the inventive microbiological composition, prochlorophytes, cyanobacteria, green sulfur bacteria, purple bacteria, chloroflexus-type forms and heliobacterium and heliobacillus-type forms are contained as facultatively phototropic micro-organisms. The above named facultatively phototropic micro-organisms may also be present as mixtures of two or more of them. In a quite particular embodiment, all six of the above named micro-organisms are present as a mixture.

The light which powers photosynthesis originates from the luminous bacteria contained in the microbiological composition of the present invention as the second essential component. These luminous bacteria possess luminosity, i.e., they are capable of emitting photons. This is a system that operates enzymatically. As an example, one may here name the luciferin/luciferase system.

In one preferred embodiment, *Photobacterium phosphoreum, Vibrio fischeri, Vibrio harveyi, Pseudomonas lucifera* or *Beneckea* are contained in the inventive mixture as luminous bacteria. It is also possible to select a mixture of at least two of these.

In order to optimize the inventive microbiological composition, additional constituents may be contained in it. Preferably such secondary constituents are plant extracts, enzymes, trace elements, polysaccharides, align derivatives, other micro-organisms as mentioned above. The secondary constituents may be present in the inventive microbiological composition by themselves or in combination. The plant extracts may, e.g., contain ribwort.

As a nutrient solution for the inventive microbiological composition, one will generally use a solution which contributes to the constituents contained therein, in particular the micro-organisms, being capable to readily exist in it. Here it is of particular importance that the interaction of photosynthesis bacteria and luminous bacteria achieves its full measure. It has been found that a biological nutrient solution with molasses, in particular raw sugar or sugarbeet molasses, is suited as a main ingredient.

The photosynthetically active micro-organisms and the luminous bacteria normally are present in the inventive microbiological composition in a ratio of 1:10 to 1:500. A preferred ratio is 1:100.

The above described components are homogenized, so that as a first intermediate product of the inventive process a microbiotic culture 6 is present, the proportions of which are adjusted as a function of the effluent to be treated.

In a subsequent process step B, the mixture is deep-frozen and optionally freeze-dried in vacuum, so that the solvent, in the present case for example water constituents, are evaporated in the frozen condition (sublimation drying). Such a dehydration is a widely used process for gentle drying and preservation of sensitive goods. The drying parameters are adjusted so as to preclude damage to the micro-organisms. It was found in preliminary trials that a cooling rate of more than 30° C. per minute, preferably about 40° C. per minute or more rapid is optimal in order to prevent damage to the micro-organisms.

By this drying step the extra-cellular polymer substances (EPS) surrounding the cells of the micro-organisms are dehydrated, so that the slimy EPS layer is thickened and forms a protective layer which protects the micro-organisms during the freezing step.

The obtained, dehydrated product 9 is then mixed with a flocculating or precipitating agent containing the polymers in a mixing stage 12, and this mixture having a predetermined concentration is added to an activated-sludge tank 14 containing effluent to be treated. Prior to mixing with the flocculating or precipitating agent 10, the drying/freezing material is built up at reduced pressure, wherein a reduced pressure of 0.01 millibar was found to be advantageous in first preliminary tests.

Oxygen is injected into the activated sludge tank, with the objective to be achieved in terms of process technology being to distribute the oxygen as homogeneously as possible and keep the forming flakes suspended, so that a large and homogeneously distributed mass transfer surface and sufficient oxygen for biological conversion will be made available.

The polymers introduced into the effluent form long chains having a positive surface charge, on which the solid suspended matter containing the organic matter and generally having a negative surface charge deposit: this results in the formation of a germination cell, the growth of which i.a. depends on the type of flocculating agents, the activity of the micro-organisms, and the composition of the effluent.

Figure 2:
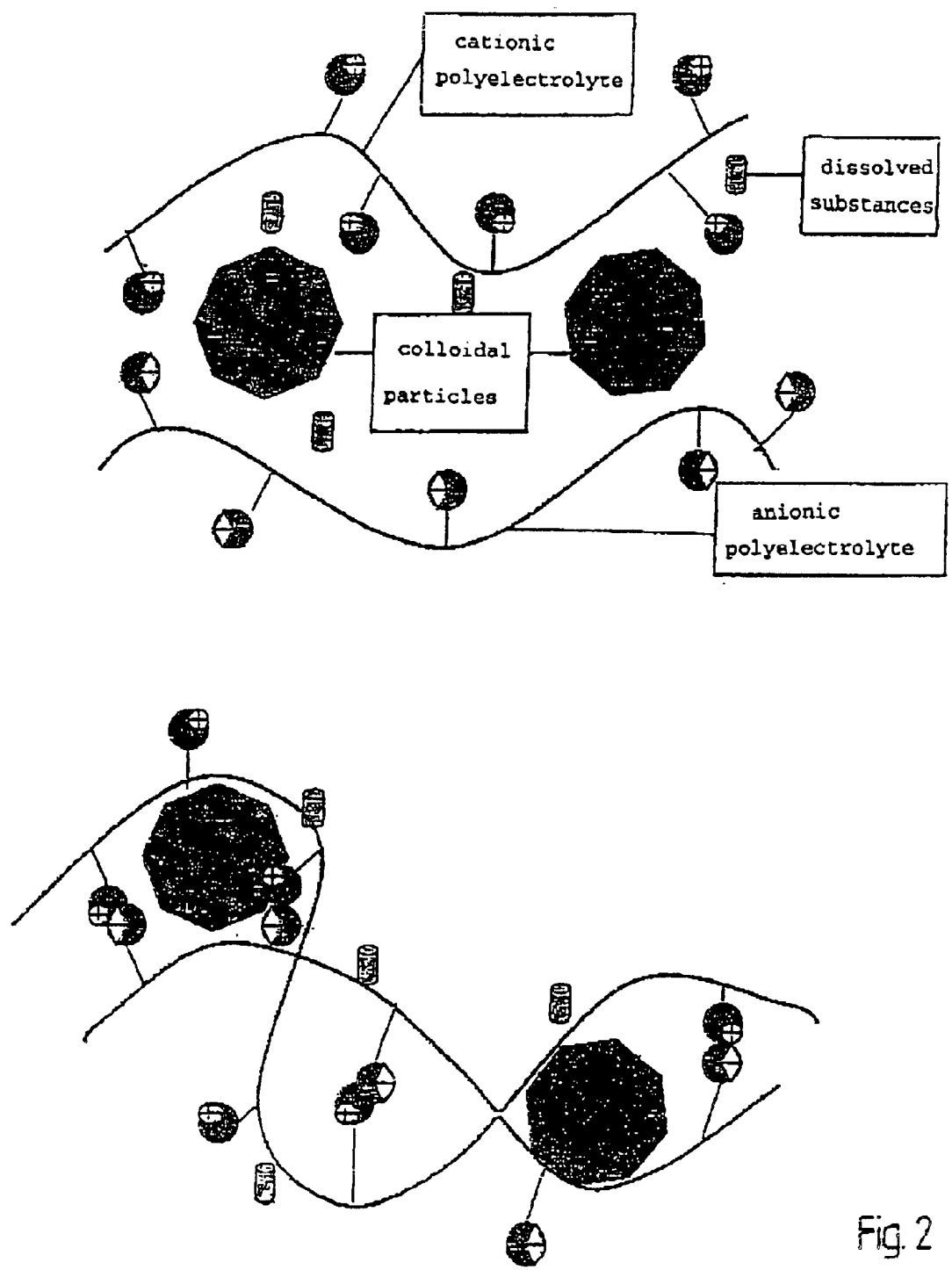
FIG. 2 is a schematic representation of flake formation in accordance with the invention.

The inventive conditioning agent acts as a flocculating agent, thereby making it possible to withdraw substances dissolved in an effluent or in a gas or substances distributed as a mist through inclusion flocculation. The basic mechanism of this inclusion flocculation is represented in FIG. 2. The filament-shaped cationic polyelectrolytes are for instance formed by proton-releasing Archaea and added charge carriers, while the anionic polyelectrolytes are made available by ion-releasing bacteria as well as the negative charge environment in the effluent or in the charged air. In particular the proton-releasing micro-organisms that are present in the mixture deposit on the sediments present in the effluent. These colloidal particles are then, as shown in FIG. 2, enclosed between the cationic and anionic polyelectrolytes and agglomerated into macroscopic flakes. The forming flake thus serves as a carrier for the micro-organisms which deposit in and on the flakes and colloidal particles. Nutrients are fixed which provide the micro-organisms in and on the flake for its growth. In particular applications it may be advantageous if the polymers and/or micro-organisms are added continuously.

In the embodiment described by reference to FIG. 1, the conditioning agent was used for the treatment of effluent.

Another area of application of the inventive conditioning agents is the purification of air charged with particulate pollutants or other gaseous matter. This set of problems shall be explained by way of a concrete example.

For the laying of slabs of cork in the industrial range, as late as into the 1960's customarily tar adhesives fabricated on the basis of coal-tar pitch or bitumen were employed. For laying the slabs of cork, these hot-melt adhesives were poured directly onto the slabs of cork and then pressed to the walls, ceilings, and on the ground. In laying wooden flooring in the business and industrial areas, as well, adhesives containing tar or bitumen have been employed up to the present day.

These tar adhesives are not being produced any more in Germany since the middle of the 1970's and have to be imported for these purposes. Cessation of the production of tar adhesives was enacted voluntarily in Germany because in the meantime technically mature, innocuous surrogate products have become available.

When structures incorporating materials bonded with tar adhesives are demolished or altered, a considerable risk to the health of the persons involved in demolition may exist, for the tar adhesives contain extremely high concentrations of polycyclic aromatic hydrocarbons (PAK). For purposes of safe labor, suitable precautions have to be met in order to preclude health hazards through dust emission and immediate skin contact. In other words, only specialized companies may be employed, while work procedures as low in dust as possible in conjunction with effective evacuation of dust must be selected. In order to minimize the release of dust upon breaking out the contaminated structural components, sufficient atomization of humidity (wetting) has to be provided. Surprisingly it was found that the PAK concentration in the air may be reduced substantially with conventional solutions by admixture of the inventive conditioning agent to the wetting agent (water), so that the health hazard during rebuilding of the like contaminated structures may be reduced at comparatively small expense. By the cationic polyelectrolytes contained in the inventive conditioning agent the released PAK particles are again combined into a kind of flakes and bound to the original substance.

As was already mentioned above, it is possible to also use microbial biopolymers instead of synthetic polymers in the inventive conditioning agent. Here it is possible, for example, to obtain a considerable increase of effectivity by the addition of chitin, which is the most commonly occurring natural biopolymer besides cellulose. Chitosan is obtained enzymatically by microbial, biochemical decomposition of crustacean chitin. Chitosan has a positive ionic charge and can therefore bind the negatively charged constituents in the effluent or in the process air. The biopolymers usable for the conditioning agent may consist of a mixture and may be manufactured from waste products of sugar-producing industries. The biopolymer is readily water-soluble with very high reactivity.

The micro-organisms contained in the inventive conditioning agent are chosen such that upon formation of a flake, a slimy extra-cellular polymer substance (EPS) is produced, in which a number of bacteria cells are embedded. As a result of this formation of slime, particularly at the surface of the flake, a kind of protective screen against toxic substances (such as heavy metals) is formed, which prevents these substances from penetrating inside the cell. The EPS may also act as a supporting structure for filiform kinds of bacteria. It is one more effect of the EPS that it acts as a diffusion barrier preventing diffusion of substances required in the conversion, such as exo-enzymes, to the outside. Moreover bacteria living in symbiosis with other kinds use the EPS as a means of being able to remain in spatial proximity of these bacteria.

The composition of the conditioning agent is chosen such that the forming flakes are surrounded by a complete EPS layer, so that the decomposing and restructuring reactions may be performed with an extremely high effectivity. The organic substances of the supplied effluent or of the charged process air to be purified are adsorbed by the flake and oxidized or built into new cell substance, wherein a part of the flake itself is consumed.

The photosynthesis described at the outset takes place within the flake, so that the latter acts as a macroscopic "photo-bioreactor".

In preliminary trials good results could be achieved with a mixture comprised of ten volume parts of solubilized micro-organisms for one volume part of polymer. Here the microbiological solution may contain about two percent (vol.) of micro-organisms.

It is another advantage of the inventive conditioning agent that the long polymer chains are cracked by the micro-organisms, so that further processing of the resulting activated sludge is facilitated. In existing facilities, the long-chain polymers frequently constitute a considerable problem in terms of process technology as regards continued processing of the sludges. Thanks to the improved biological conversion, resulting activated sludge may be decomposed substantially more rapidly than in hitherto known processes in the digestion facility.

What is disclosed is a conditioning agent for the treatment of effluent and process air, a process for preparing such a conditioning agent, and use of the conditioning agent which includes a proportion of flocculating or precipitating agent containing polymers (biopolymers, conjugated polymers, other organic or inorganic polymers) as well as a proportion of micro-organisms.

What is claimed is:

1. A conditioning agent for the treatment of effluent or charged air, including a proportion of a polymer supporting flake formation or precipitation, characterized by a proportion comprised of a microbiotic mixed culture containing photosynthetically active micro-organisms and luminous bacteria in a biological solution.

2. The conditioning agent as claimed in claim 1, wherein said mixed culture is deep-frozen or freeze-dried prior to mixing with said polymers.

3. The conditioning agent as claimed in claim 1, wherein prochlorophytes, cyanobacteria, green sulfur bacteria, purple bacteria, chloroflexus-type forms and heliobacterium and heliobacillus-type forms as well as mixtures of two or more of these are contained in said mixture as facultatively phototropic micro-organisms.

4. The conditioning agent as claimed in claim 1, wherein Photobacterium phosphoreum, *Vibrio fischeri, Vibria harveyi, Pseudomonas lucifera* or *Beneckea* or mixtures of at least two of these are contained in said mixture as luminous bacteria.

5. The conditioning agent as claimed in claim 1, wherein it furthermore contains plant extracts, enzymes, trace elements, polysaccharides, align derivatives, other microorganisms as secondary constituents, either by themselves or in combination.

6. The conditioning agent as claimed in claim 1, having one volume part of flocculation aids for ten volume parts of said mixed culture.

7. The conditioning agent as claimed in claim 1, wherein said polymer is a conjugated polymer.

8. The conditioning agent as claimed in claim 1, wherein said conditioning agent contains biopolymers.

9. A process for preparing a conditioning agent as claimed in claim 1, including the steps:
preparing at least one of a group including a polymer and a mixture of polymers, said at least one of a polymer and a mixture of polymers acting as a flocculating or precipitating agent;
preparing a microbiotic mixed culture with microorganisms in a biological solution; and
mixing said mixed culture with said at least one of a polymer and a mixture of polymers.

10. The process as claimed in claim 9, wherein said mixed culture is deep-frozen or freeze-dried.

11. The process as claimed in claim 9, wherein said mixed culture is cooled down to a temperature below −50° C.

12. The process as claimed in claim 9, wherein said mixed culture is thawed prior to mixing with said at least one of a polymer and a mixture of polymers.

13. The process as claimed in claim 12, wherein said mixed culture is thawed under reduced pressure.

14. A process of purifying water, comprising the steps of:
introducing a conditioning agent as claimed in claim 1 into the water; and
biologically purifying the water with said conditioning agent.

15. The process as claimed in claim 14, wherein upon introduction of said conditioning agent into effluent, said mixed culture forms a bio-film on the surface of a flake forming on said polymers.

16. A process of binding particulate atmospheric pollutants, comprising the steps of:
introducing a conditioning agent as claimed in claim 1 into the atmosphere; and
binding particulate atmospheric pollutants with said conditioning agent.

17. The process as claimed in claim 16, wherein said step of introducing said conditioning agent comprises adding said conditioning agent to a wetting agent which is sprayed in the form of a mist into the atmosphere.

18. A process for preparing a conditioning agent for the biological purification of effluent, including the steps:
preparing at least one of a polymer and a mixture of polymers acting as a flocculating or precipitating agent;
preparing a microbiotic mixed culture containing photosynthetically active micro-organisms and luminous bacteria in a biological solution; and
mixing said mixed culture with said at least one of a polymer and a mixture of polymers.

19. A conditioning agent for the treatment of effluent or charged air, comprising:
a polymer supporting flake formation or precipitation; and
a microbiotic mixed culture containing photosynthetically active micro-organisms and luminous bacteria in a biological solution.

20. The conditioning agent as claimed in claim 19, wherein said mixed culture is deep-frozen or freeze-dried prior to mixing with said polymers.

21. The conditioning agent as claimed in claim 19, wherein said microbiotic mixed culture comprises prochlorophytes, cyanobacteria, green sulfur bacteria, purple bacteria, chloroflexus-type forms and heliobacterium and heliobacillus-type forms.

22. The conditioning agent as claimed in claim 19, wherein said luminous bacteria comprise Photobacterium phosphoreum, *Vibrio fischeri, Vibrio harveyi, Pseudomonas lucifera* or *Beneckea* or mixtures of at least two of these.

23. The conditioning agent as claimed in claim 19, further comprising one or more micro-organisms as secondary constituents.

24. The conditioning agent as claimed in claim 19, wherein said conditioning agent has one volume part of said polymer for ten volume parts of said mixed culture.

25. A process for preparing a conditioning agent, comprising the steps of:
preparing at least one of a group including a polymer and a mixture of polymers, said at least one of a polymer and a mixture of polymers acting as a flocculating or precipitating agent;
preparing a microbiotic mixed culture including photosynthetically active micro-organisms and luminous bacteria in a biological solution in a biological solution; and
mixing said mixed culture with said at least one of a polymer and a mixture of polymers.

26. The process as claimed in claim 25, wherein said mixed culture is deep-frozen or freeze-dried.

27. The process as claimed in claim 25, wherein said mixed culture is cooled down to a temperature below −50° C.

28. The process as claimed in claim 25, wherein said mixed culture is thawed prior to mixing with said at least one of a polymer and a mixture of polymers.

29. A process of purifying water, comprising the steps of:
introducing a conditioning agent including (1) a polymer supporting flake formation or precipitation, and (2) a microbiotic mixed culture containing photosynthetically active micro-organisms and luminous bacteria in a biological solution into the water; and biologically purifying the water with said conditioning agent.

30. The process as claimed in claim 29, wherein upon introduction of said conditioning agent into effluent, said mixed culture forms a bio-film on the surface of a flake forming on said polymers.

31. The process as claimed in claim 29, wherein said step of introducing said conditioning agent comprises adding said conditioning agent to a wetting agent which is sprayed in the form of a mist into the atmosphere.

32. A process for preparing a conditioning agent for the biological purification of effluent, comprising the steps of:

preparing at least one of a polymer and a mixture of polymers acting as a flocculating or precipitating agent;

preparing a microbiotic mixed culture containing photosynthetically active micro-organisms and luminous bacteria in a biological solution; and mixing said mixed culture with said at least one of a polymer and a mixture of polymers.

* * * * *